Patented May 19, 1925.

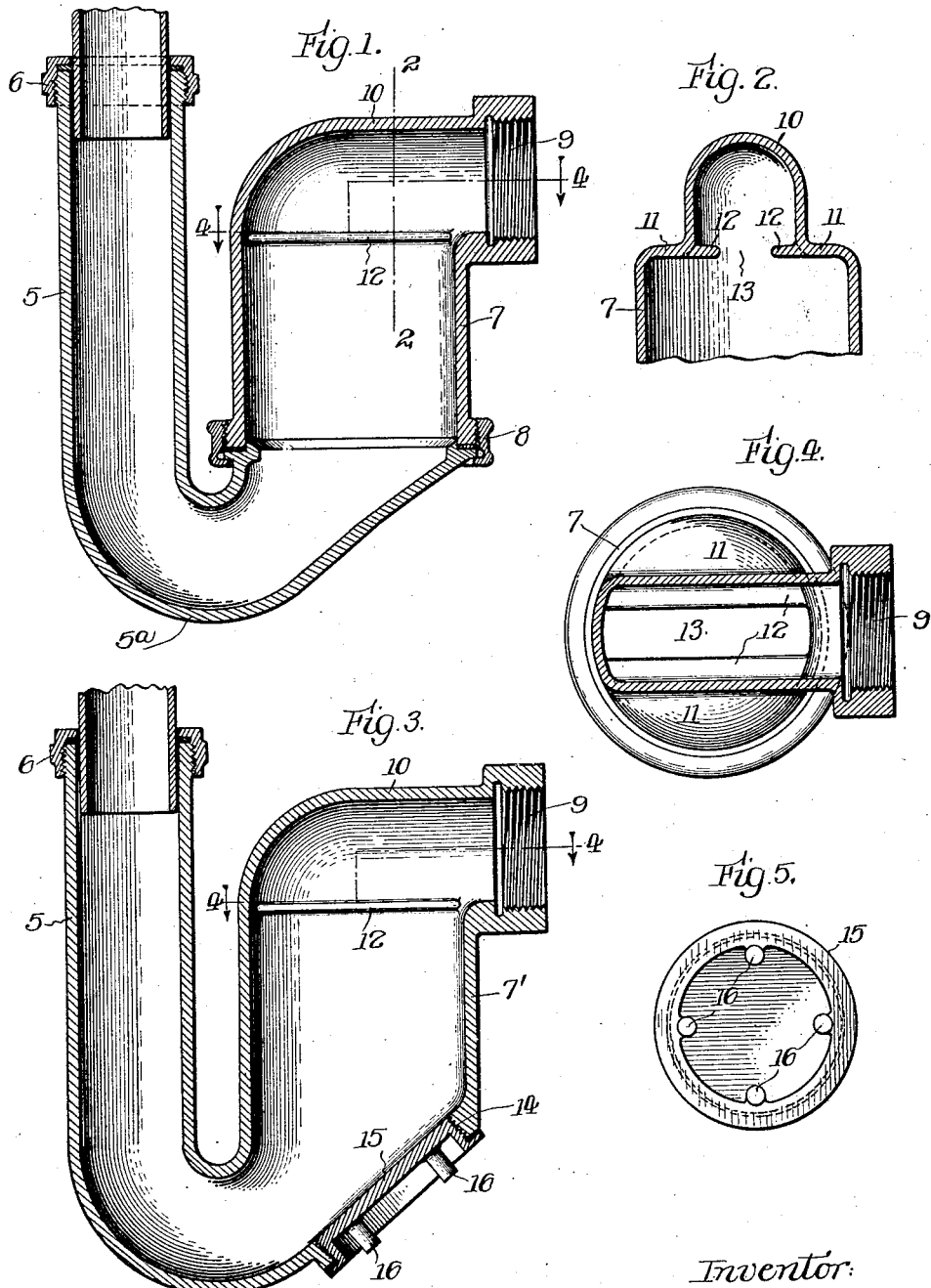

1,537,954

UNITED STATES PATENT OFFICE.

HENRY J. LUFF, OF CLEVELAND, OHIO, ASSIGNOR, BY MESNE ASSIGNMENTS, TO MARY A. LUFF, OF CLEVELAND, OHIO.

RESEALING TRAP.

Application filed June 9, 1922. Serial No. 567,181.

*To all whom it may concern:*

Be it known that I, HENRY J. LUFF, a citizen of the United States, residing at Cleveland, in the county of Cuyahoga and State of Ohio, have invented certain new and useful Improvements in Resealing Traps, for use under any fixture from which the discharge enters directly or indirectly into a building sewer or building drain; and I do hereby declare that the following is a full, clear, and exact description of the invention, which will enable others skilled in the art to which it appertains to make and use the same.

Most municipal drainage regulations require certain minimum standards of sealing, scouring and resealing efficiency to be maintained in traps, under the maximum conditions of installation permissible and it is with a view to fully meeting such requirements that the present resealing trap has been designed.

It is recognized by health officials that the water sealing trap placed under fixtures used to discharge liquid wastes into the building drainage system acts as a sentinel to guard against the inflow of noxious and germ-laden sewer air into homes and buildings, and therefore the requirement for the highest standard of efficiency is justified on the ground of public health. Experience has taught health officials that the practice of relying wholly upon "back-vent" or "re-vent" pipes to maintain the water seal in uniform diameter traps is fraught with considerable danger and expense, since they frequently fail to function at the times of greatest need; their inefficiency being manifested by the fact that in protracted freezing temperatures the vapor from hot water discharged into the drainage system passes up through these "back-vent" or "re-vent" pipes and at the point where the latter extend through the roof this vapor freezes and the pipe is gradually reduced in area and often completely frozen over. Moreover, in order to prevent birds from using these roof pipes as nests or perching thereon, wire baskets are frequently placed over them, and these wire baskets reduce the area, so that it is practically impossible to prevent the non-functioning of these roof vents from frost closure or during ice storms.

Many forms of so-called "anti-siphon" traps have been designed to prevent complete trap siphonage, in which baffle plates, secret partitions, deflectors, stand pipes, and impractical enlargement of the outlet leg and depth of seal, have been used; but these have retarded the natural outflow of the waste, thus preventing self-scouring efficiency; also gathered hair and lint in such a manner as to produce capillary attraction of the liquid and consequent siphonage of the trap seal; also the solids retained created a foul odor in the trap seal; and in many such traps a defect in the casting has permitted the entire seal of the trap to leak unnoticed into the waste pipe, or sewer air to leak over the seal of the trap into the room.

To provide a resealing trap which will obviate all of the above noted defects and objections has been the main purpose and object of the present invention, which latter, in one practical and approved embodiment thereof, is hereinafter fully described and disclosed in the accompanying drawings, in which—

Fig. 1 is a vertical sectional elevation of an exposed trap embodying my invention, wherein the inflow and discharge legs of the trap are separate castings joined by a union connection.

Fig. 2 is a vertical section taken on the line 2—2 of Fig. 1;

Fig. 3 is a view similar to Fig. 1 of a trap wherein the inlet and discharge legs are made as a single casting, the discharge leg being provided at its bottom with an inspection clean-out opening closed by a removable plug; and Fig. 4 is a horizontal section taken on the line 4—4 of Figs. 1 and 3; and Fig. 5 is a plan view of the clean-out plug.

The resealing trap of the present invention is broadly characterized by a provision of a discharge leg which is of greater diameter than the inlet leg and the discharge opening of the trap, and substantially horizontal baffle plates at the upper end of the discharge leg so spaced as to effectively cause a resealing of the trap when the fixture is discharged and at the same time provide an opening between them of an area substantially equal to the area of the discharge opening; together with a clean-out and inspection opening at the lower end of the discharge leg of sufficient size to permit the insertion of the hand for inspection of the condition of the baffle plates and the ready removal of any possible accumulations thereon.

Referring first to Figs. 1 and 2, 5 designates the inflow leg of the trap that may be connected at its upper end by a union connection 6 to the drain pipe from a fixture; and 7 designates the discharge leg of the trap of considerably larger diameter than the inflow leg 5. The lower portion 5ᵃ of the inflow leg 5 is curved upwardly to form the bottom of the seal and at its upper end is flared outwardly and widened to the diameter of the discharge leg 7, to the lower end of which it is connected by an ordinary union joint 8.

9 designates a tapped discharge opening of the trap located at the outer end of a narrowed upper portion 10 of the discharge leg 7, by which narrowed portion the waste is deflected from a vertical to a horizontal path of flow. As clearly shown in Fig. 2, the lower edges of the extension 10 are merged into the upper end of the main section 7 of the discharge leg by a pair of segmental shaped horizontal walls 11, seen also in Fig. 4, the inner edges of which are extended inwardly, as shown at 12 sufficiently to form between them a substantially rectangular port or opening 13, which port or opening has substantially the same area as the discharge pipe (not shown) which enters the tapped discharge opening 9.

The form of the invention illustrated in Fig. 3 embodies all of the structural features above described in connection with Figs. 1 and 2, but, in lieu of being made in two castings united by the union connection 8, it is made in a single casting; and for inspection and clean-out purposes, the lower inclined wall of the discharge leg 7' is formed with a sizable tapped opening 14 closed by a screw plug 15; which latter, to facilitate its application and removal is provided with a plurality of spaced lugs 16 (Fig. 5), for the application of a spanner wrench or other similar tool to loosen and tighten the same. The clean-out opening 14 and its plug 15 are in practice of sufficient size to afford easy access to all parts of the trap not readily accessible from the inlet or outlet openings.

The inflow leg 5 and its lower curved portion 5ᵃ are designed to carry as small an amount of water as possible below the bottom of the trap seal, so that the water which is held in suspension by the baffles 11, 12, when siphonic action takes place during a discharge, will quickly fall back and refill the lower curved portion of the trap and secure the maximum depth of reseal. In the device shown in Fig. 1, inspection and cleaning are readily effected through the lower end of the discharge leg 7 by simply disconnecting the union connection 8. This connection, moreover, obviously allows the setting of the inflow leg 5 at any desired angle around the vertical axis of the discharge leg 7.

While I show the elongated opening 13 as disposed parallel to the discharge opening of the trap, it is manifest that the particular angle of said opening relatively to the discharge opening is immaterial; but to secure the best results, the two openings should be of approximately the same area.

Furthermore, while I show the discharge or outlet 9 at an angle of 90° to the discharge leg 7, or 7', of the trap, it is manifest that it will function with equal efficiency at any angle from 90° to the vertical; or it may be offset so as to bring it in vertical alignment with the inlet leg of the trap. Again, while I show the inlet leg of the trap in a vertical position, it may with equal efficiency be disposed at an angle of 45° to the vertical, or it may be carried at an angle of 90° from a point at least one inch above the bottom of the seal. The term "resealing" as used herein is understood in the art by most persons skilled therein, but may be briefly explained, as follows. When siphonic action takes place, either by the length of the vertical or downward grade of the fixture discharged, or the passage of waste from a higher fixture producing a vacuum, a part of the trap seal is siphoned out until air is admitted through the inlet, after which the water held in suspension while siphonic action is in progress, refills and reseals the trap to a safe depth. To effect the holding of sufficient water in suspension, the relative enlargement of the discharge leg of the trap and the baffles 11, 12, are contributing factors of prime importance and efficiency.

I claim—

1. A resealing trap for the discharge lines of plumbing fixtures having a discharge leg of greater diameter than the discharge opening, and flat baffle plates disposed transversely of said discharge leg in the same horizontal plane and forming between them an opening of substantially the area of said discharge opening.

2. A resealing trap for the discharge lines of plumbing fixtures having a discharge leg of greater diameter than the discharge opening, and a pair of flat segmental baffle plates disposed transversely of said discharge leg in the same horizontal plane and forming between them a substantially rectangular opening having approximately the area of said discharge opening.

3. A resealing trap for the discharge lines of plumbing fixtures having a vertical discharge leg and a horizontally directed discharge opening at the upper end of said discharge leg, the diameter of said discharge leg being greater than the diameter of said discharge opening, and a pair of horizontal segmental baffle plates disposed transversely of said discharge leg in the same horizontal plane and forming between them a substantially rectangular opening having approximately the area of said discharge opening.

4. A resealing trap for the discharge lines of plumbing fixtures, having a vertical discharge leg and a horizontally directed discharge opening at the upper end of said discharge leg, the diameter of said discharge leg being greater than the diameter of the inflow leg and of said discharge opening, and a pair of horizontal segmental baffle plates disposed transversely of said discharge leg at the level of the bottom of said discharge opening and forming between them a restricted flow passage of substantially the same area as said discharge opening.

5. A resealing trap for the discharge lines of plumbing fixtures having a discharge leg of greater diameter than the discharge opening, baffle plates disposed transversely of the upper portion of said discharge leg in the same horizontal plane and forming between them a restricted flow passage of substantially the same area as said discharge opening, a clean-out opening in the lower portion of said discharge leg, and a removable plug closing said clean-out opening.

6. A resealing trap for the discharge lines of plumbing fixtures, having a vertical discharge leg and a horizontally directed discharge passage at the upper end of said discharge leg, the diameter of said discharge leg being greater than the diameter of the inflow leg and of said discharge passage, and a pair of horizontal segmental baffle plates located on opposite sides respectively of said discharge passage at the level of the bottom of the latter and forming between them a relatively long and narrow flow passage whose longitudinal axis is parallel with the axis of said discharge passage.

HENRY J. LUFF.